US012621247B2

(12) United States Patent　　(10) Patent No.:　US 12,621,247 B2
Kouzmenkov et al.　　　　　　　(45) Date of Patent:　　　May 5, 2026

(54) DETERMINING WHEN ROUTES MAY BE ADVERTISED BY A NETWORK DEVICE IN THE CONTEXT OF ASYNCHRONOUS HARDWARE PLATFORM PROCESSING CODE RESPONSES

(71) Applicant: Arista Networks, Inc., Santa Clara, CA (US)

(72) Inventors: Arseniy Kouzmenkov, Santa Clara, CA (US); Trevor Siemens, Santa Clara, CA (US); Mayukh Saubhasik, Santa Clara, CA (US); Vahab Akbarzadeh, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 454 days.

(21) Appl. No.: 18/326,891

(22) Filed: May 31, 2023

(65) Prior Publication Data

US 2024/0406115 A1　　Dec. 5, 2024

(51) Int. Cl.
*H04L 47/34*　　(2022.01)
*H04L 45/02*　　(2022.01)
(52) U.S. Cl.
CPC ............. *H04L 47/34* (2013.01); *H04L 45/04* (2013.01)
(58) Field of Classification Search
CPC .......... H04L 47/34; H04L 45/04; H04L 45/54
See application file for complete search history.

(56) References Cited

U.S. PATENT DOCUMENTS

| | | | |
|---|---|---|---|
| 9,294,304 B2 * | 3/2016 | Sindhu | H04L 12/4641 |
| 9,479,457 B2 * | 10/2016 | Sindhu | H04L 49/111 |
| 9,703,743 B2 * | 7/2017 | Sindhu | H04L 49/70 |
| 10,498,529 B1 * | 12/2019 | Hashmi | H04L 9/0618 |
| 11,398,927 B1 * | 7/2022 | Malhotra | H04L 45/02 |
| 11,924,103 B2 * | 3/2024 | Zhuang | H04L 63/0263 |
| 12,244,495 B2 * | 3/2025 | Andhe | H04L 47/34 |
| 2006/0092857 A1 * | 5/2006 | Ansari | H04L 45/26 370/254 |
| 2007/0192451 A1 * | 8/2007 | Tran | H04L 12/1836 709/223 |

(Continued)

OTHER PUBLICATIONS

Yaonan Liang, BGP per AFI/SAFI Update Wait-for-Covergence, EOS 4.22.1F TOI, Oct. 11, 2019, pp. 1-2, Arista Networks, Inc.

*Primary Examiner* — Wutchung Chu
(74) *Attorney, Agent, or Firm* — Tianyi He

(57) ABSTRACT

Some disclosed examples involve receiving information regarding a forwarding information base (FIB) sequence number, placing the FIB sequence number into a FIB sequence number queue and assigning the FIB sequence number a first state. Some examples involve receiving a route processing request including an indication of a route and a platform sequence number associated with the FIB sequence number, assigning the FIB sequence number a second state and placing the route processing request into a route-associated queue corresponding to the route. Some examples involve receiving a route processing response corresponding to the route and corresponding to one or more route processing requests, including the route processing request, removing the route processing request from the route-associated queue, assigning the FIB sequence number a third state and publishing the FIB sequence number.

18 Claims, 11 Drawing Sheets

(56)  References Cited

U.S. PATENT DOCUMENTS

| | | | |
|---|---|---|---|
| 2008/0126722 A1* | 5/2008 | Korlepara | G06F 11/1451 |
| | | | 711/E12.103 |
| 2012/0017022 A1* | 1/2012 | Corrigan | G06F 15/1735 |
| | | | 710/311 |
| 2016/0080246 A1* | 3/2016 | Yong | H04L 47/263 |
| | | | 709/223 |
| 2016/0330102 A1* | 11/2016 | Fenner | H04L 45/02 |
| 2017/0295099 A1* | 10/2017 | Murphy | H04L 47/125 |
| 2017/0302563 A1* | 10/2017 | Wang | H04L 45/02 |
| 2021/0226910 A1* | 7/2021 | Ranpise | H04L 61/2592 |
| 2021/0297350 A1* | 9/2021 | Vegesna | H04L 12/12 |
| 2021/0297351 A1* | 9/2021 | Vegesna | H04L 12/4633 |
| 2022/0045986 A1* | 2/2022 | Lo | H04W 12/062 |
| 2022/0345300 A1* | 10/2022 | Inamdar | H04L 63/0869 |
| 2023/0132016 A1* | 4/2023 | Lo | H04L 45/76 |
| | | | 370/392 |
| 2023/0344751 A1* | 10/2023 | Hao | H04L 45/20 |
| 2024/0406115 A1* | 12/2024 | Kouzmenkov | H04L 45/04 |

* cited by examiner

**FIB Sequence Number Queue
at Time T1**

Order of Placement in Queue

**FIB Sequence Number Queue
at Time T2**

**FIB Sequence Number Queue
at Time T3**

**Per-Route Request Queues
at Time T3**

Order of Placement in Queue

FIB Sequence Number Queue at Time T4

| 11N | 10N | 9STP | 8STP | 7STP | 6STP | 5P | 4O | 3P | 2STP | 1STP |
|-----|-----|------|------|------|------|----|----|----|----|----|

— 201

Per-Route Request Queues at Time T4

— 301a

| RPR (7,P9) | RPR (1,P3) |
|---|---|

303e    303b

— 301b

| RPR (9,P8) | RPR (2,P7) |
|---|---|

303g    303f

— 301n

| RPR (6,P10) | RPR (8,P4) |
|---|---|

303h    303d

← Order of Placement in Queue

**FIB Sequence Number Queue
at Time T5**

| 13N | 12N | 11STP | 10STP | 9STP | 8STP | 7STP | 6STP | 5P | 4O | 3P | 2P | 1P |
|---|---|---|---|---|---|---|---|---|---|---|---|---|

— 201

**Per-Route Request Queues at
Time T5**

— 301a

| RPR (11,P12) | RPR (7,P9) |
|---|---|

303i    303e

— 301b

| RPR (10,P11) | RPR (9,P8) |
|---|---|

303j    303g

• 301n

| RPR (6,P10) | RPR (8,P4) |
|---|---|

303h    303d

←——— Order of Placement in Queue

**FIB Sequence Number Queue
at Time T6**

— 201

| 15STP | 14N | 13STP | 12STP | 11STP | 10STP | 9STP | 8P | 7P | 6STP |
|---|---|---|---|---|---|---|---|---|---|

**Per-Route Request Queues at
Time T6**

— 301a

| RPR (13,P14) | RPR (11,P12) |
|---|---|

303k          303i

— 301b

| RPR (15,P15) | RPR (10,P11) | RPR (9,P8) |
|---|---|---|

303m          303j          303g

— 301n

| RPR (12,P13) | RPR (6,P10) |
|---|---|

303l          303h

Order of Placement in Queue

**FIB Sequence Number Queue
at Time T7**

| 15STP | 14N | 13STP | 12STP | 11STP | 10P | 9P | 8P | 7P | 6STP |
|---|---|---|---|---|---|---|---|---|---|

— 201

**Per-Route Request Queues at
Time T6**

— 301a

RPR
(13,P14)
303k

RPR
(11,P12)
303i

— 301b

RPR
(15,P15)
303m

— 301n

RPR
(12,P13)
303l

RPR
(6,P10)
303h

Order of Placement in Queue

501

DETERMINING WHEN ROUTES MAY BE ADVERTISED BY A NETWORK DEVICE IN THE CONTEXT OF ASYNCHRONOUS HARDWARE PLATFORM PROCESSING CODE RESPONSES

TECHNICAL FIELD

This disclosure relates generally to network devices and more specifically to gateway network devices.

BACKGROUND

Arista's Border Gateway Protocol (BGP) configures network devices for exchanging routing information among neighboring routers, which are also known as "peers." Static peers may be established by manual configuration commands. Dynamic peers may be established by creating a peer group listen range and accepting incoming peering requests in that range. Internal BGP (iBGP) peers operate within a single Autonomous System (AS). External BGP (eBGP) peers operate between ASs. Border routers are on AS boundaries and exchange information with other autonomous systems. An important function of border routers is distributing routes.

During established BGP sessions, routers exchange UPDATE messages about the destinations to which they offer connectivity. In some examples, the route description includes the destination prefix, prefix length, autonomous systems in the path, the next hop, and information that affects the acceptance policy of the receiving router. UPDATE messages also may list destinations to which the router no longer offers connectivity.

In order to decide when BGP routes may be advertised by a network device, the BGP implementation needs to know when routes are programmed in hardware so that advertising of routes occurs only after the routes have been programmed in hardware. As previously implemented, the "update wait-install" feature addressed this problem by associating route processing requests with sequence numbers and expecting to see the same sequence numbers in a response from the hardware platform processing code after the routes have been processed.

When the "update wait-install" feature was originally implemented, the hardware platform processing code worked synchronously and processed all routes passed to the platform processing code in the order received, without coalescing processing requests. However, according to current BGP implementations, hardware platform processing code responses may be coalesced, out-of-order, asynchronous, or combinations thereof. As used herein, a "coalesced" hardware platform processing code response is responsive to multiple processing requests. It would be desirable to develop improved methods, devices and systems capable of processing coalesced, out-of-order and asynchronous hardware platform processing code responses for route programming.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
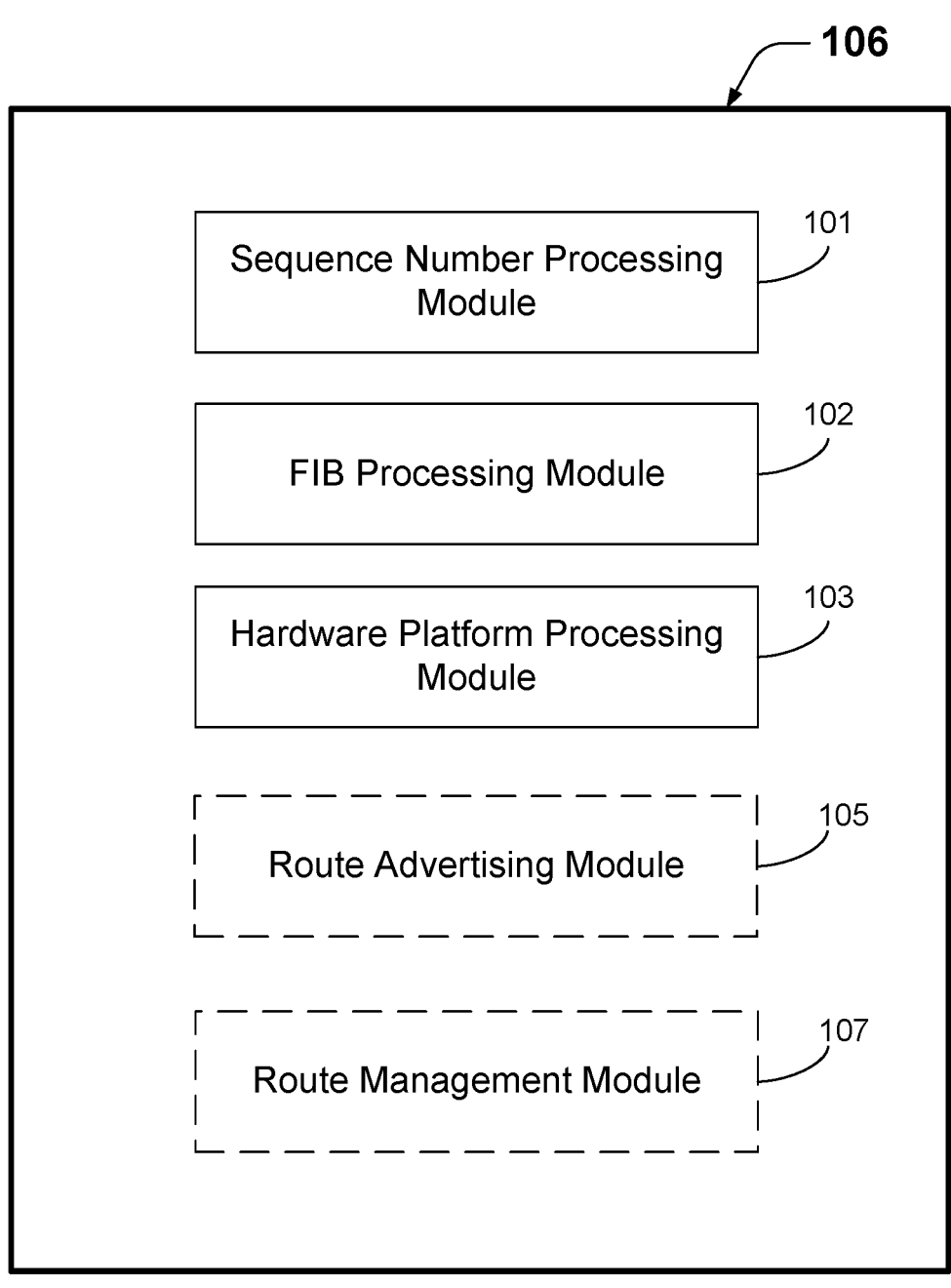
FIG. 1A is a block diagram that represents modules implemented by a control system according to one example.

The following description is directed to certain implementations for the purposes of describing the innovative aspects of this disclosure. However, a person of ordinary skill in the art (POSITA) will readily recognize that the teachings herein may be applied in a multitude of different ways. Thus, the disclosed teachings are not intended to be limited to the implementations depicted solely in the Figures, but instead have wide applicability as will be readily apparent to one having ordinary skill in the art. For example, while the examples disclosed herein are primarily directed to network devices implementing the Border Gateway Protocol developed by the present assignee, a POSITA will realize that the disclosed examples also apply to similar systems and similar protocols. As used herein, the term "network device" may refer, for example, to a router or a switch.

Some disclosed implementations provide an adapter module for the improved "update wait-install" feature of the BGP. The adapter module of the present disclosure—which also may be referred to herein as "a sequence number processing module"—allows the "update wait-install" feature to handle coalesced, out-of-order and asynchronous hardware platform processing code responses for route programming in the hardware.

The adapter module accomplishes these goals primarily by assigning states to sequence numbers, by updating sequence number states and by managing queues of sequence numbers and route processing requests. In some examples, the adapter module places each new forwarding information base (FIB) sequence number, awaiting processing by the hardware platform processing code, received by the adapter module in a FIB sequence number queue and assigns the FIB sequence number a state of "new." If the adapter module receives an indication that a route has changed from one FIB sequence number having a "new" state to another FIB sequence number, and if the old FIB sequence number is still present in the FIB sequence number queue the adapter module may change the old FIB sequence number's state to "updated" (which also may be referred to herein as "obsoleted") and may assign the new FIB sequence number a state of "new".

When the adapter module receives an indication that a route associated with a certain FIB sequence number is requested to be processed by the hardware platform processing code (for example, when the adapter module receives a hardware platform sequence number associated with the FIB sequence number and a route), the adapter module may change the state of the FIB sequence number to a "sent-to-platform" state and may place the route processing request in a per-route request queue.

When the adapter module receives a route processing response from the hardware platform processing code, the adapter module may set the state of FIB sequence numbers associated with all requests for that route that are covered by the route processing response to "processed." The adapter module also may remove all such requests from the per-route request queue. The terms "hardware platform processing code response" and "route processing response" are equivalent and may be used interchangeably herein.

According to some such examples, after the adapter module has changed the state of a FIB sequence number to either "processed" or "updated," the adapter module processes the FIB sequence number queue. In some examples, the adapter module publishes all FIB sequence numbers in the "processed" or "updated" state at the head of the FIB sequence number queue and removes these sequence numbers from the FIB sequence number queue. In some examples, the adapter module clears the state of each published sequence number. In this context, "publishing" the FIB sequence numbers means that the FIB sequence numbers are placed in the adapter module's output, as input for one or more other modules running on the same network device's control system. Once the FIB sequence number queue is empty, or the sequence number at the head of the FIB sequence number queue is no longer in a "processed" or "updated" state, in some examples the adapter module stops the processing of the FIB sequence number queue—in other words, pauses the process of publishing FIB sequence numbers—until another FIB sequence number at the head of the FIB sequence number queue has its state changed to either "processed" or "updated."

FIG. 1A is a block diagram that represents modules implemented by a control system according to one example. As with other disclosed examples, alternative implementations may include different numbers of elements, different types of elements, or combinations thereof.

Figure 5:
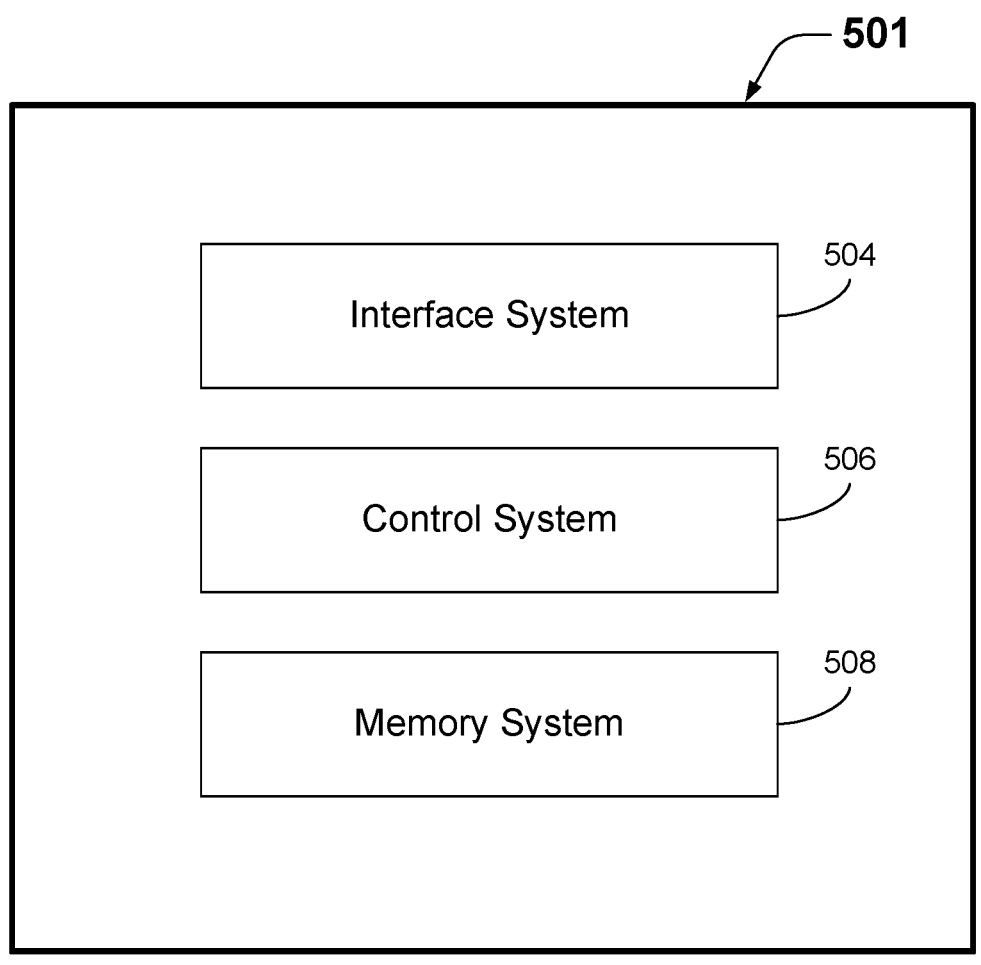
FIG. 5 is a block diagram that shows example components of an apparatus according to some disclosed implementations.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to this example, the control system 106 also includes one or more memory devices, such as one or more random access memory (RAM) devices, one or more read-only memory (ROM) devices, etc. In some examples, the control system 106 may be a component of the apparatus 501 that is shown in FIG. 5. According to this example, the control system 106 is a component of a network device, such as the network device 600 of FIG. 6. The network device may, for example, be a switch or a router. In this example, the network device is configured for exchanging routing information with one or more neighboring network devices.

In this example, the control system 106 is configured to implement a sequence number processing module 101, a FIB processing module 102 and a hardware platform processing module 103. In some examples, the control system 106 is configured to implement a route advertising module 105 and a route management module 107. The sequence number processing module 101, FIB processing module 102, hardware platform processing module 103, route advertising module 105 and route management module 107 may, for example, be implemented via instructions—such as software—stored in a memory system that is part of, or accessible by, the control system 106. According to this example, the hardware platform processing module 103 is configured to implement what is referred to herein as the "hardware platform processing code." In this example, the hardware platform processing module 103 is configured for programming routes in hardware of the control system 106, such as programming routes in one or more ASICs. According to this example, the FIB processing module 102 is configured to obtain route information from a FIB and to send corresponding requests to the hardware platform processing module 103. In this example, the route advertising module 105 is configured to determine which routes are ready to be advertised as being ready to forward traffic via the network device. According to this example, the route management module 107 is configured to implement rules regarding the programming of routes by the hardware platform processing module 103.

Figure 1B:
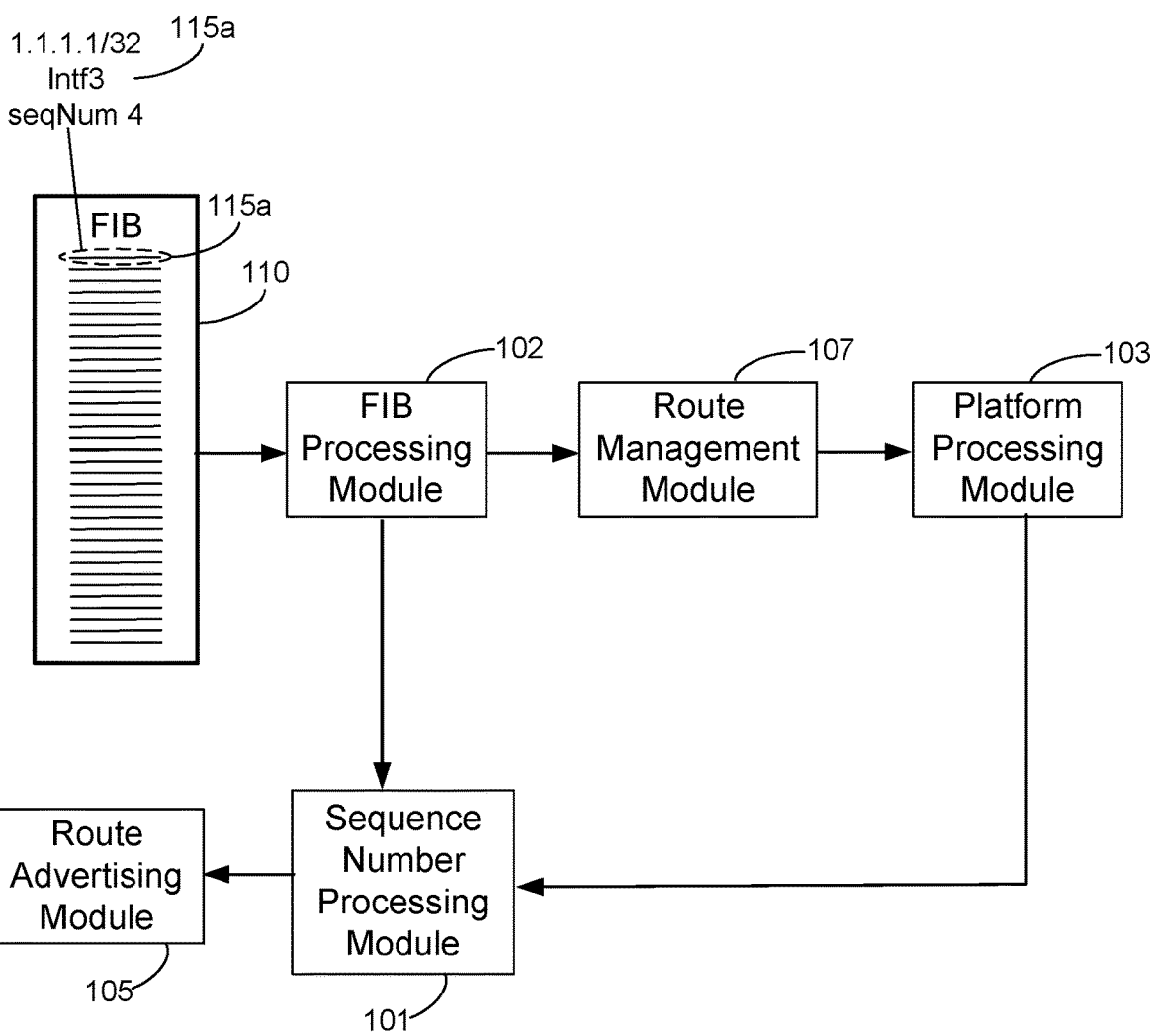
FIG. 1B shows examples of interactions between the modules of FIG. 1A.

FIG. 1B shows examples of interactions between the modules of FIG. 1A. According to this example, the FIB processing module 102 is configured to obtain route information from an FIB 110. One example of data in the FIB 110 is shown as FIB data entry 115a. Here, the FIB data entry 115a includes route identity information (1.1.1.1/32, in this example), interface forwarding information (intf3, in this example) and a sequence number (seqNum 4, in this example). The FIB data entry 115a is an example of what may be referred to herein as "route information."

In this example, the FIB processing module 102 is configured to obtain route information from the FIB 110 and to send corresponding route requests to the hardware platform processing module 103 and to the sequence number processing module 101. According to this example, the FIB processing module 102 is configured to send route requests to the hardware platform processing module 103 via the route management module 107, which is configured to apply rules to the route requests from the FIB processing module 102 regarding the programming of routes by the hardware platform processing module 103. For example, the route management module may be configured to determine whether there are hardware resources available to process route A within the hardware platform processing code. If a certain resource (for example, a longest prefix match (LPM) hardware table entry or a longest exact match (LEM) hardware table entry) is unavailable for route A, then the route management module 107 may delay its own processing of route A for a later point in time and process a different route, e.g., route Z, in the interim.

The sequence number processing module 101 is configured to implement what may be referred to herein as an adapter module. In this example, the sequence number processing module 101 is configured to receive information from the FIB processing module 102 about what sequence numbers are requested to be processed, to receive information about what routes have been requested to be processed by the hardware platform processing module 103, and to receive and process responses from the hardware platform processing module 103. According to some examples, the sequence number processing module 101 is capable of processing coalesced, out-of-order and asynchronous hardware platform processing code responses for route programming. According to some examples, the sequence number processing module 101 is configured for "uncoalescing" coalesced responses from the hardware platform processing module 103, for restoring the order to the route processing requests, and for publishing the output response with correct sequence numbers. In this context, "publishing" the sequence number means sending the sequence number to one or more inputs of one or more other modules that are implemented by the control system 106, such as the route advertising module 105. In some such examples, publishing the sequence number by the sequence number processing module 101 indicates that all routes with sequence numbers less than or equal to the sequence number being published have been processed by the hardware platform processing module 103. According to some examples, the sequence number processing module 101 is configured to remove published sequence numbers from the FIB sequence number queue. In some examples, the sequence number processing module 101 is configured to clear the state of each published sequence number. Some detailed examples of processes that the sequence number processing module 101 may implement are disclosed herein with reference to FIG. 2A et seq.

According to this example, the route advertising module 105 is configured to determine, based on sequence numbers published by the sequence number processing module 101, which routes are ready to be advertised as being ready to forward traffic via the network device. In this example, the route advertising module 105 is configured to advertise these routes to other network devices.

Figure 2A:
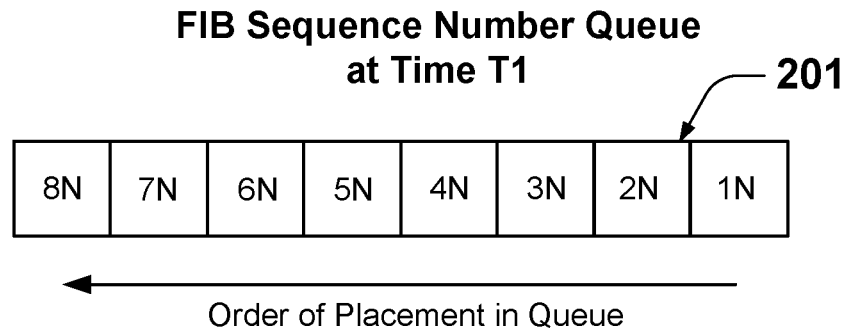
FIG. 2A shows an example of a queue of forwarding information base (FIB) sequence numbers that have been stored in a memory.

FIG. 2A shows an example of a queue of forwarding information base (FIB) sequence numbers that have been stored in a queue in a memory. The memory may be part of the control system 106 or may be part of a memory system that is accessible by the control system 106. As with other disclosed examples, alternative implementations may include different numbers of elements, different types of elements, or combinations thereof. For example, the number of elements in the FIB sequence number queue 201 may, in some examples, be much greater than indicated in FIG. 2A. Alternatively, or additionally, in some examples one or more sequence numbers in the FIB sequence number queue 201 may not be sequential: for example, one or more sequence numbers may be skipped, such that there may be a gap between the sequence numbers in the FIB sequence number queue 201.

In this example, the FIB sequence number queue 201 includes the FIB sequence numbers 1-8 at time "T1," which is an arbitrarily-defined instant in time. In this example, each of the FIB sequence numbers corresponds to a route. According to this example, the sequence number processing module 101 has received requests from the FIB processing module 102 for the FIB sequence numbers 1-8 to be processed according to a routing protocol, has assigned the FIB sequence numbers 1-8 a state of "new" (indicated by "N" in FIG. 2A) and has placed the FIB sequence numbers 1-8 in the FIB sequence number queue 201. The "new" state may sometimes be referred to herein as a "first state." As indicated by the "order of placement in queue" arrow shown in FIG. 2A, the sequence number processing module 101 has placed the FIB sequence numbers 1-8 in the FIB sequence number queue 201 in numerical order in this example.

Figure 2B:
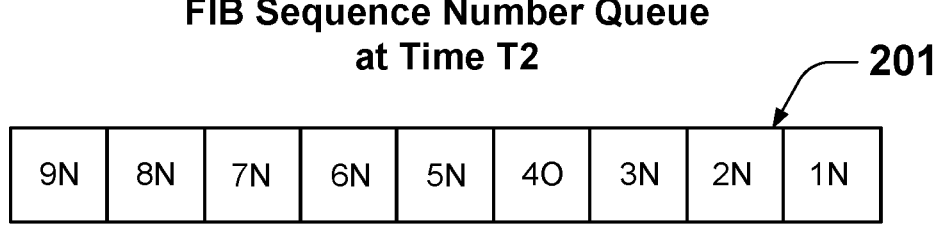
FIG. 2B shows an example of the FIB sequence number queue of FIG. 2A at a subsequent time.

FIG. 2B shows an example of the FIB sequence number queue of FIG. 2A at a subsequent time. In this example, FIG. 2B shows the FIB sequence number queue 201 at a time T2, which is after time T1. According to this example, the sequence number processing module 101 has received an indication from the FIB processing module 102 that a route has changed from a first FIB sequence number to a second FIB sequence number: here, the sequence number 4 was initially associated with the route, but is no longer associated with that route. Instead, FIB sequence number 9 is now associated with the route. For example, the same FIB route may have had its forwarding information change from one interface to another before the FIB route was processed by the hardware platform. The old state is no longer relevant, and thus the old sequence number—which was sequence number 4 in this example—will be assigned an "obsoleted" state." Responsive to receiving the indication that the route has changed from a first FIB sequence number to a second FIB sequence number, the sequence number processing module 101 has assigned the second FIB sequence number (9) a "new" state and has changed the state of the first FIB sequence number (4) from the first state to an obsoleted state. Accordingly, the FIB sequence number 4 is shown as "40" in FIG. 2B, indicating that the FIB sequence number 4 now has the "obsoleted" state.

Figure 3A:
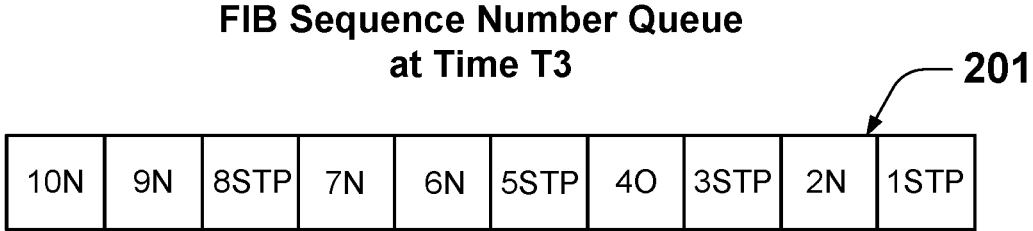
FIG. 3A shows an example of the FIB sequence number queue of FIG. 2B and per-route request queues at a subsequent time.
Figure 3A:
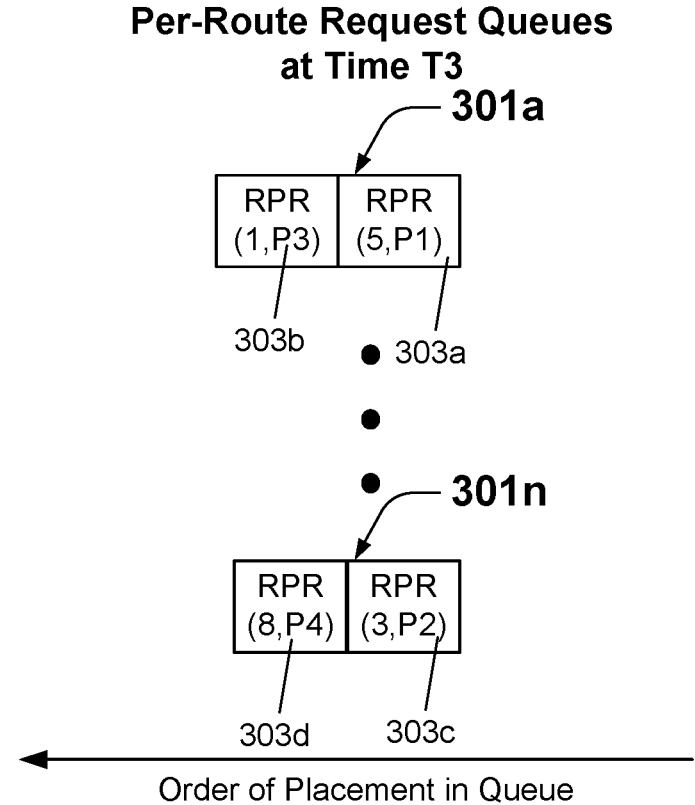

FIG. 3A shows an example of the FIB sequence number queue of FIG. 2B and per-route request queues at a subsequent time. In this example, FIG. 3A shows the FIB sequence number queue 201 at a time T3, which is after time T2. According to this example, FIG. 3A also shows examples of per-route request queues 301a and 301n.

In this example, the sequence number processing module 101 has received route processing requests during a time interval between time T2 and time T3. According to this example, the sequence number processing module 101 has received the route processing requests from the hardware platform processing module 103. Here, each of the route processing requests includes an indication of a route and a platform sequence number associated with the FIB sequence number.

According to this example, the route processing requests indicated that the FIB sequence numbers 5 and 1 are associated with a first route, which corresponds to the per-route request queue 301a, and that the FIB sequence numbers 3 and 8 are associated with a second route, which corresponds to the per-route request queue 301n. Accordingly, the sequence number processing module 101 has placed corresponding route processing requests (RPR), or information corresponding to the route processing requests, into the per-route request queues 301a and 301n. Here, the sequence number processing module 101 has placed the route processing request 303a, which corresponds to the FIB sequence number 5 and the platform sequence number 1, shown as P1 in FIG. 3A, into the per-route request queue 301a. Accordingly, the route processing request 303a is also shown as RPR(5,P1) in FIG. 3A. In this example, the sequence number processing module 101 has subsequently placed the route processing request 303b, which corresponds to the FIB sequence number 1 and the platform sequence number 3, into the per-route request queue 301a. Accordingly, the route processing request 303b is also shown as RPR(1,P3).

In this example, the sequence number processing module 101 has placed the route processing request 303c, which corresponds to the FIB sequence number 3 and the platform sequence number 2, into the per-route request queue 301n. Here, the sequence number processing module 101 has subsequently placed the route processing request 303d, which corresponds to the FIB sequence number 8 and the platform sequence number 4, into the per-route request queue 301n.

According to this example, the sequence number processing module 101 has assigned the FIB sequence numbers 1, 3, 5 and 8 a second state, which in this example is a "sent to platform" state. Therefore, the FIB sequence number queue 201 now shows the FIB sequence numbers 1, 3, 5 and 8 as 1STP, 3STP, 5STP and 8STP.

In this example, the sequence number processing module 101 has received a request for the FIB sequence number 10 to be processed during the time interval between time T2 and time T3. Here, the sequence number processing module 101 has assigned the FIB sequence number 10 a state of "new" and has placed the FIB sequence number 10 in the FIB sequence number queue 201.

Figure 3B:
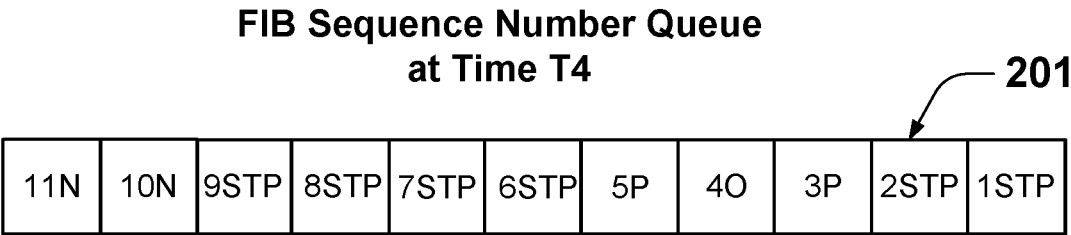
FIG. 3B shows an example of the FIB sequence number queue of FIG. 3A and per-route request queues at a subsequent time.
Figure 3B:
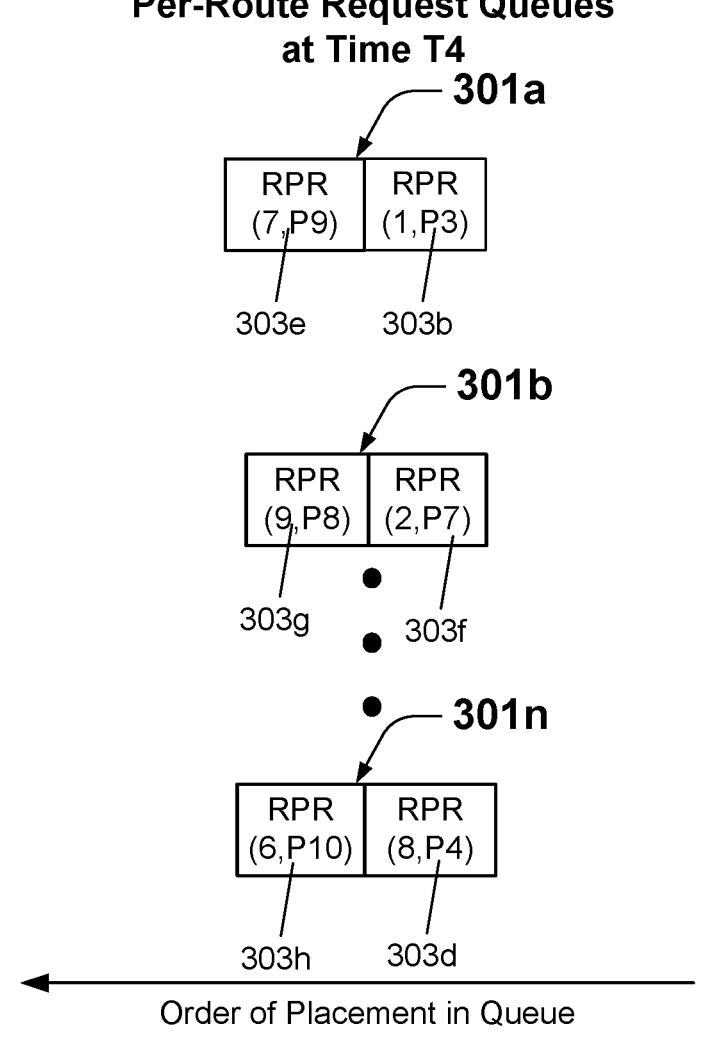

FIG. 3B shows an example of the FIB sequence number queue of FIG. 3A and per-route request queues at a subsequent time. In this example, FIG. 3B shows the FIB sequence number queue 201 at a time T4, which is after time T3. According to this example, FIG. 3B also shows examples of per-route request queues 301a, 301b and 301n.

In this example, the sequence number processing module 101 has received route processing requests from the hardware platform processing module 103 during a time interval between time T3 and time T4. According to this example, the sequence number processing module 101 has received route processing requests corresponding to sequence numbers 2, 6, 7 and 9.

According to this example, the route processing requests indicated that the FIB sequence number 7 and the platform sequence number 9 are associated with the first route, which corresponds to the per-route request queue 301a, that the FIB sequence number 6 and the platform sequence number 10 are associated with the second route, which corresponds to the per-route request queue 301n, and that the FIB sequence numbers 2 and 9 and the platform sequence numbers 7 and 8, respectively, are associated with a third route, which corresponds to the per-route request queue 301b. Accordingly, the sequence number processing module 101 has placed corresponding route processing requests (RPR), or information corresponding to the route processing requests, into the per-route request queues 301a, 301b and 301n. Here, the sequence number processing module 101 has placed the route processing request 303e, which corresponds to the FIB sequence number 7 and the platform sequence number 9, into the per-route request queue 301a. In this example, the sequence number processing module 101 has placed the route processing request 303h, which corresponds to the FIB sequence number 6 and the platform sequence number 10, into the per-route request queue 301n.

Here, the sequence number processing module 101 has placed the route processing request 303f, which corresponds to the FIB sequence number 2 and the platform sequence number 7, into the per-route request queue 301b. In this example, the sequence number processing module 101 has subsequently placed the route processing request 303g, which corresponds to the FIB sequence number 9 and the platform sequence number 8, into the per-route request queue 301b.

According to this example, the sequence number processing module 101 has assigned the FIB sequence numbers 2, 6, 7 and 9 the "sent to platform" state. Therefore, the FIB sequence number queue 201 now shows the FIB sequence numbers 2, 6, 7 and 9 as 2STP, 6STP, 7STP and 9STP.

In this example, the sequence number processing module 101 has received a request for the FIB sequence number 11 to be processed during the time interval between time T3 and time T4. Here, the sequence number processing module 101 has assigned the FIB sequence number 11 a state of "new" and has placed the FIB sequence number 11 in the FIB sequence number queue 201.

According to this example, during the time interval between time T3 and time T4, the sequence number processing module 101 has received route processing responses corresponding to routes and route processing requests. More specifically, the sequence number processing module 101 has received a route processing response from the hardware platform processing module 103 corresponding to the route associated with the per-route request queue 301a and corresponding to the FIB sequence number 5 and the platform sequence number 1. In this example, the route processing response indicated that the hardware platform processing module 103 has programmed a route into hardware (such as an ASIC of the control system 106) corresponding to the FIB sequence number 5 and the platform sequence number 1. Accordingly, the sequence number processing module 101 has removed the route processing request corresponding to the FIB sequence number 5 and the platform sequence number 1 from the head of the per-route request queue 301a. In this example, the sequence number processing module 101 has changed the state of the FIB sequence number 5 to a "processed" state. Therefore, the FIB sequence number queue 201 now shows the FIB sequence number 5 as "5P," indicating its current processed state.

Similarly, during the time interval between time T3 and time T4, the sequence number processing module 101 has received a route processing response from the hardware platform processing module 103 corresponding to the route associated with the per-route request queue 301n and corresponding to the FIB sequence number 3 and the platform sequence number 2. Accordingly, the sequence number processing module 101 has removed the route processing request corresponding to the FIB sequence number 3 from the head of the per-route request queue 301n and has changed the state of the FIB sequence number 3 to the "processed" state. According to this example, only route processing requests at the head of a per-route request queue can be processed. However, in some alternative implementations, route processing requests that are not at the head of a per-route request queue may be processed.

In some implementations, the sequence number processing module 101 may receive "coalesced" route processing responses from the hardware platform processing module 103 and may be configured for "uncoalescing" the coalesced route processing responses. According to some examples, a coalesced response could indicate—or suggest—multiple requests for a route. In some examples, a single coalesced route processing response indicates only a final version that has been programmed into hardware, but may correspond to multiple intermediate versions that may or may not have been programmed into hardware. The uncoalesced route processing response may, in some examples, include all of the multiple intermediate versions, whether or not they were actually programmed into hardware.

Figure 3C:
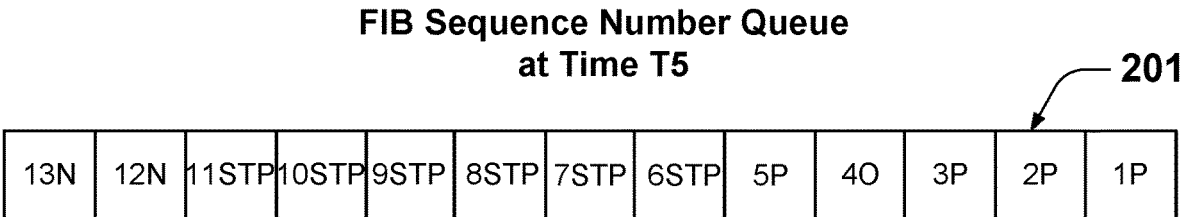
FIG. 3C shows an example of the FIB sequence number queue of FIG. 3B and per-route request queues at a subsequent time.
Figure 3C:
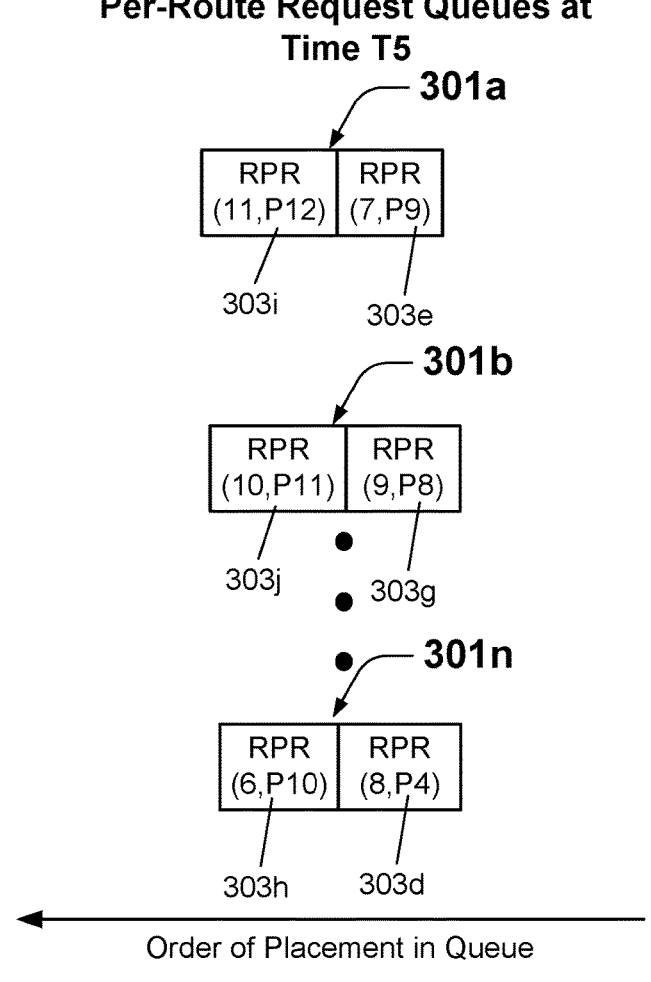

FIG. 3C shows an example of the FIB sequence number queue of FIG. 3B and per-route request queues at a subsequent time. In this example, FIG. 3C shows the FIB sequence number queue 201 at a time T5, which is after time T4. According to this example, FIG. 3C also shows examples of per-route request queues 301a, 301b and 301n.

In this example, the sequence number processing module 101 has received route processing requests from the hardware platform processing module 103 corresponding to sequence numbers 10 and 11 during a time interval between time T4 and time T5. According to this example, the route processing requests indicated that the FIB sequence number 11 and the platform sequence number 12 are associated with the first route, which corresponds to the per-route request queue 301a and that the FIB sequence number 10 and the platform sequence number 11 are associated with the third route, which corresponds to the per-route request queue 301b. Accordingly, the sequence number processing module 101 has placed corresponding route processing requests (RPR), or information corresponding to the route processing requests, into the per-route request queues 301a and 301b. Here, the sequence number processing module 101 has placed the route processing request 303i, which corresponds to the FIB sequence number 11 and the platform sequence number 12, into the per-route request queue 301a. In this example, the sequence number processing module 101 has placed the route processing request 303j, which corresponds to the FIB sequence number 10 and the platform sequence number 11, into the per-route request queue 301b.

According to this example, the sequence number processing module 101 has assigned the FIB sequence numbers 10 and 11 the "sent to platform" state. Therefore, the FIB sequence number queue 201 now shows the FIB sequence numbers 10 and 11 as 10STP and 11STP.

In this example, the sequence number processing module 101 has received a request for the FIB sequence numbers 12 and 13 to be processed during the time interval between time T4 and time T5. Here, the sequence number processing module 101 has assigned the FIB sequence numbers 12 and 13 a state of "new" and has placed the FIB sequence numbers 12 and 13 in the FIB sequence number queue 201.

According to this example, during the time interval between time T4 and time T5, the sequence number processing module 101 has received additional route processing responses corresponding to routes and route processing requests. More specifically, the sequence number processing module 101 has received a route processing response from the hardware platform processing module 103 corresponding to the route associated with the per-route request queue 301a and corresponding to the FIB sequence number 1 and the platform sequence number 3. Accordingly, the sequence number processing module 101 has removed the route processing request corresponding to the FIB sequence number 1 and the platform sequence number 3 from the head of the per-route request queue 301a. In this example, the sequence number processing module 101 has changed the state of the FIB sequence number 1 to a "processed" state. Therefore, the FIB sequence number queue 201 now shows the FIB sequence number 1 as "IP," indicating its current processed state.

Similarly, during the time interval between time T4 and time T5, the sequence number processing module 101 has received a route processing response from the hardware platform processing module 103 corresponding to the route associated with the per-route request queue 301b and corresponding to the FIB sequence number 2 and the platform sequence number 7. Accordingly, the sequence number processing module 101 has removed the route processing request corresponding to the FIB sequence number 2 and the platform sequence number 7 from the head of the per-route request queue 301b and has changed the state of the FIB sequence number 2 to the "processed" state.

According to this example, only those FIB sequence numbers having a state of obsoleted or processed that are at the head of the FIB sequence number queue 201 will be removed from the FIB sequence number queue 201. As used herein, the "head" of the FIB sequence number queue 201 refers to the position of the FIB sequence number that was first placed in the FIB sequence number queue 201 and still remains in the FIB sequence number queue 201. For example, as shown in FIG. 3C, at the time T5, the FIB sequence number 1 is at the head of the FIB sequence number queue 201. Accordingly, this example is a first in, first out (FIFO) example. However, according to some alternative examples, all FIB sequence numbers having a state of obsoleted or processed may be removed from the FIB sequence number queue 201, whether or not those FIB sequence numbers having a state of obsoleted or processed are at the head of the FIB sequence number queue 201. At time T5, FIB sequence numbers 1-5 all have a state of obsoleted or processed and could be removed from the FIB sequence number queue 201 according to some disclosed examples (for example, sequentially, starting at the head of the FIB sequence number queue 201).

Figure 3D:
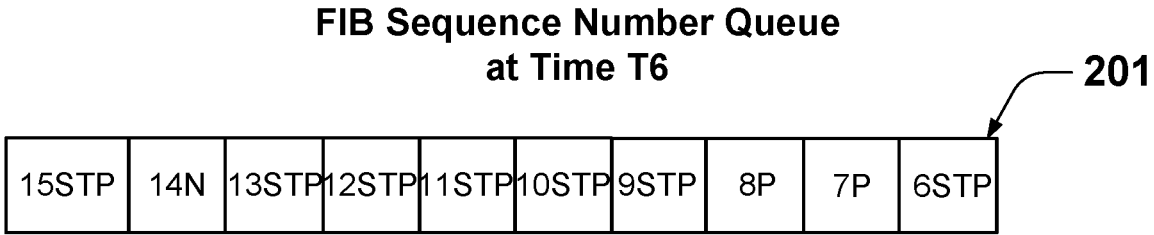
FIG. 3D shows an example of the FIB sequence number queue of FIG. 3C and per-route request queues at a subsequent time.
Figure 3D:
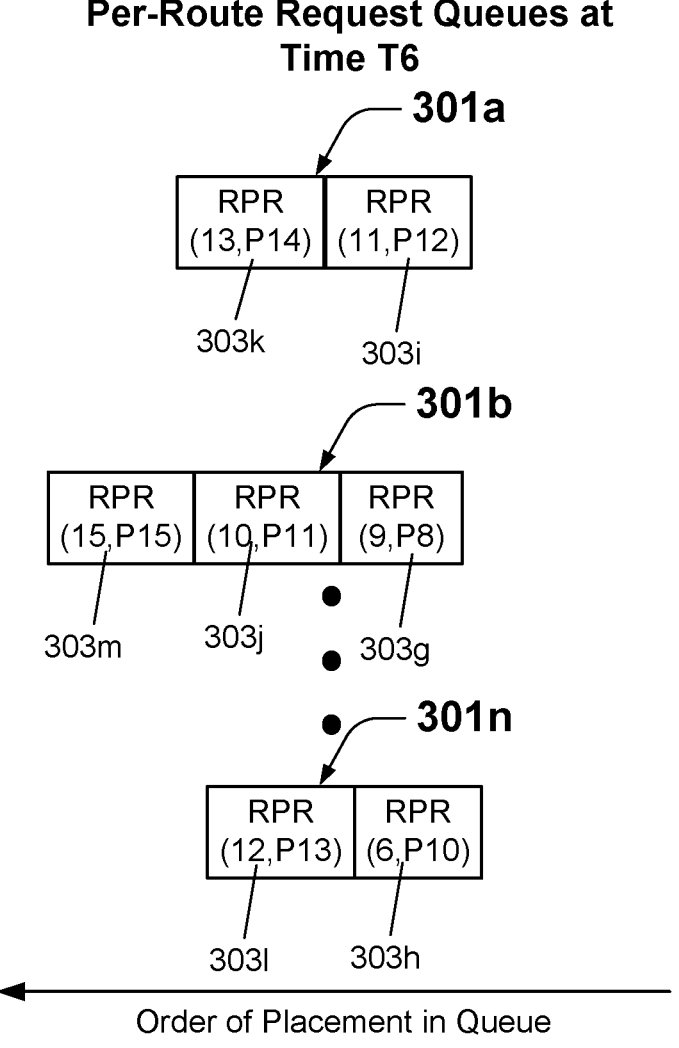

FIG. 3D shows an example of the FIB sequence number queue of FIG. 3C and per-route request queues at a subsequent time. In this example, FIG. 3D shows the FIB sequence number queue 201 at a time T6, which is after time T5. According to this example, FIG. 3D also shows examples of per-route request queues 301a, 301b and 301n.

According to this example, FIB sequence numbers 1-5 all had a state of obsoleted or processed as of time T5 and have been removed from the FIB sequence number queue 201 by the time T6. In this example, the sequence number processing module 101 has "published" the FIB sequence numbers 1-5 and has cleared the state of the FIB sequence numbers 1-5. In this example, publishing the FIB sequence numbers 1-5 involves sending the FIB sequence numbers 1-5 to one or more other modules implemented by the control system 106, such as the route advertising module 105. According to some examples, the sequence number processing module 101 is configured to remove published sequence numbers from the FIB sequence number queue 201. In some examples, the sequence number processing module 101 is not configured to store the FIB sequence number state in the FIB sequence number queue 201, but rather in another place (for example, in a different data structure stored in memory) as a mapping from an FIB sequence number to a state. According to some such examples, when the sequence number processing module 101 clears the state of an FIB sequence number, the sequence number processing module 101 may delete that mapping, which causes the FIB sequence number to no longer have any assigned state.

In this example, the sequence number processing module 101 has received a request for the FIB sequence numbers 14 and 15 to be processed during the time interval between time T5 and time T6. Here, the sequence number processing module 101 had initially assigned the FIB sequence numbers 14 and 15 a state of "new" and had placed the FIB sequence numbers 14 and 15 in the FIB sequence number queue 201.

In this example, the sequence number processing module 101 has received route processing requests from the hardware platform processing module 103 corresponding to sequence numbers 12, 13 and 15 during the time interval between time T5 and time T6. According to this example, the route processing requests indicated that the FIB sequence number 13 and the platform sequence number 14 are associated with the first route, which corresponds to the per-route request queue 301a, that the FIB sequence number 12 and the platform sequence number 13 are associated with the second route, which corresponds to the per-route request queue 301n and that the FIB sequence number 15 and the platform sequence number 15 are associated with the third route, which corresponds to the per-route request queue 301b. Accordingly, the sequence number processing module 101 has placed corresponding route processing requests, or information corresponding to the route processing requests, into the per-route request queues 301a, 301b and 301n. The per-route request queues 301a, 301b and 301n in this example correspond with the route processing requests associated with routes A, B and N, respectively. Here, the sequence number processing module 101 has placed the route processing request 303k, which corresponds to the FIB sequence number 13 and the platform sequence number 14, into the per-route request queue 301a. In this example, the sequence number processing module 101 has placed the route processing request 303l, which corresponds to the FIB sequence number 12 and the platform sequence number 13, into the per-route request queue 301n, and has placed the route processing request 303m, which corresponds to the FIB sequence number 15 and the platform sequence number 15, into the per-route request queue 301b.

According to this example, the sequence number processing module 101 has assigned the FIB sequence numbers 12, 13 and 15 the "sent to platform" state. Therefore, the FIB sequence number queue 201 now shows the FIB sequence numbers 12, 13 and 15 as 12STP, 13STP and 15STP.

According to this example, during the time interval between time T5 and time T6, the sequence number processing module 101 has received additional route processing responses corresponding to routes and route processing requests. The sequence number processing module 101 has received a route processing response from the hardware platform processing module 103 corresponding to the route associated with the per-route request queue 301a and corresponding to the FIB sequence number 7 and the platform sequence number 9. Accordingly, the sequence number processing module 101 has removed the route processing request corresponding to the FIB sequence number 7 and the platform sequence number 9 from the head of the per-route request queue 301a. In this example, the sequence number processing module 101 has changed the state of the FIB sequence number 7 to a "processed" state.

Similarly, during the time interval between time T5 and time T6, the sequence number processing module 101 has received a route processing response from the hardware platform processing module 103 corresponding to the route associated with the per-route request queue 301n and corresponding to the FIB sequence number 8 and the platform sequence number 4. Accordingly, the sequence number processing module 101 has removed the route processing request corresponding to the FIB sequence number 8 and the platform sequence number 4 from the head of the per-route request queue 301b and has changed the state of the FIB sequence number 8 to the "processed" state.

According to this example, the FIB sequence number at the head of the FIB sequence number queue 201—the FIB sequence number 6—has a state of STP. Therefore, in this example, although the FIB sequence numbers 7 and 8 have a "processed" state, the FIB sequence numbers 7 and 8 have not yet been published or removed from the FIB sequence number queue 201.

Figure 3E:
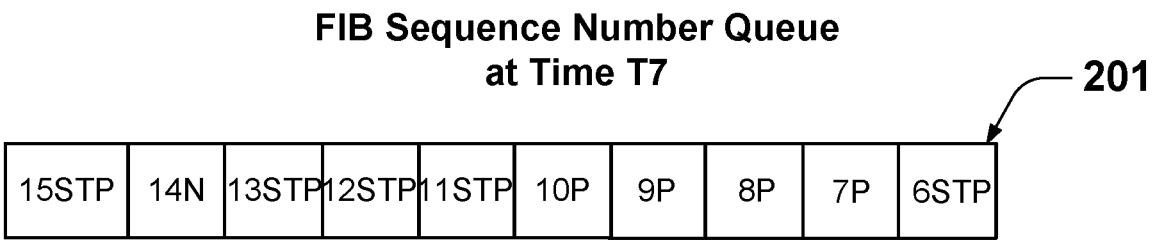
FIG. 3E shows an example of the FIB sequence number queue of FIG. 3D and per-route request queues at a subsequent time.
Figure 3E:
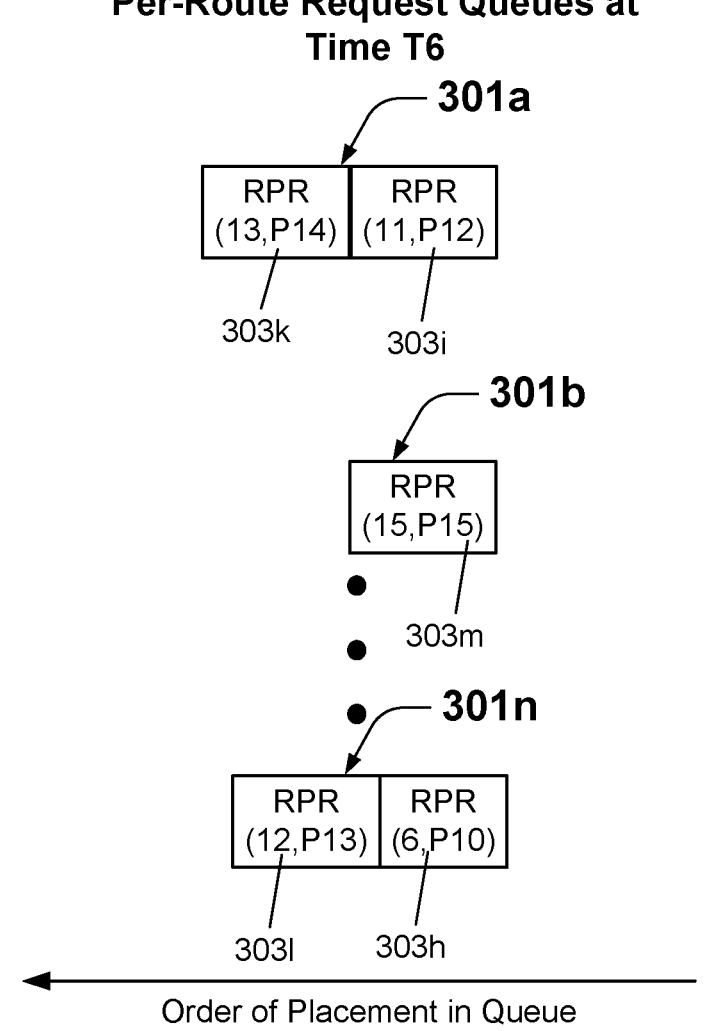

FIG. 3E shows an example of the FIB sequence number queue of FIG. 3D and per-route request queues at a subsequent time. In this example, FIG. 3E shows the FIB sequence number queue 201 at a time T7, which is after time T6. According to this example, FIG. 3E also shows examples of per-route request queues 301a, 301b and 301n.

According to this example, between time T6 and time T7, the sequence number processing module 101 received a coalesced response from the hardware platform processing module 103. In some implementations, the hardware platform processing module 103 may return route processing responses in the form of (Platform Sequence Number, Route Identifier), which indicates that all route requests for a route corresponding to the route identifier with a platform sequence number less than or equal to what was returned have been handled by the hardware platform processing module 103. In this example, the coalesced response indicated "P11, B," which referred to platform sequence number P11 and route B. This coalesced response covered both RPR (10,P11) and RPR (9,P8) in the per-route request queue 301b, which corresponds to route B. In this example, the sequence number processing module 101 de-coalesced the coalesced response by checking RPR (9,P8)—which was at the head of the per-route request queue 301b—and determining that the platform sequence number 11 of the coalesced response was greater than or equal to platform sequence number 8 of RPR (9,P8). Accordingly, the sequence number processing module 101 removed the route processing request 303g corresponding to the FIB sequence number 9 and the platform sequence number 8 from the head of the per-route request queue 301b and changed the state of the FIB sequence number 9 to the "processed" state.

After the route processing request 303g was removed from the per-route request queue 301b, the route processing request 303j was then at the head of the queue. In this example, the sequence number processing module 101 continued to de-coalesce the coalesced response by checking RPR (10,P11)—which was then at the head of the per-route request queue 301b—and determining that the platform sequence number 11 of the coalesced response was greater than or equal to platform sequence number 11 of RPR (10,P11). Accordingly, the sequence number processing module 101 removed the route processing request 303j from the head of the per-route request queue 301b and changed the state of the FIB sequence number 10 to the "processed" state.

Figure 4:
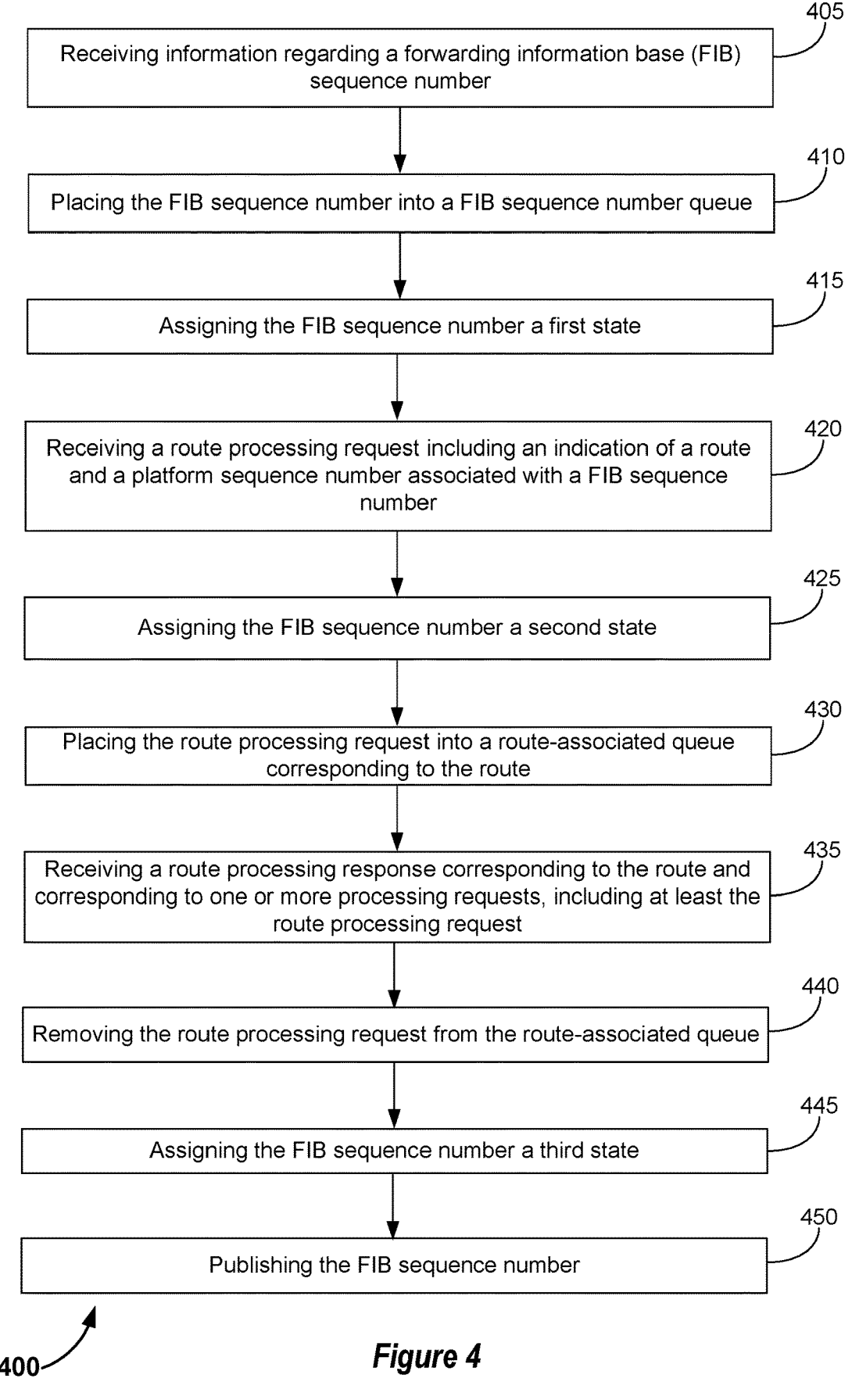
FIG. 4 is a flow diagram that presents examples of operations according to some disclosed methods.

FIG. 4 is a flow diagram that presents examples of operations according to some disclosed methods. The blocks of FIG. 4 may, for example, be performed by the apparatus of FIG. 1 or FIG. 5, or by a similar apparatus. For example, in some implementations the control system 106 of FIG. 1 or the control system 506 of FIG. 5 may be configured to perform, at least in part, the operations that are described herein with reference to FIG. 4. In some examples, the control system may be the control system of a network device, such as a router that is configured for exchanging routing information with one or more neighboring network devices. According to some examples, the sequence number processing module 101 of FIG. 1 may be configured to perform, at least in part, the operations that are described herein with reference to FIG. 4. As with other methods disclosed herein, the methods outlined in FIG. 4 may include more or fewer blocks than indicated. Moreover, the blocks of methods disclosed herein are not necessarily performed in the order indicated. In some implementations, one or more blocks may be performed concurrently.

According to this example, block 405 involves receiving information regarding a forwarding information base (FIB) sequence number. In some examples, the sequence number processing module 101 of FIG. 1 may receive information regarding the FIB sequence number in block 405.

In this example, block 410 involves placing the FIB sequence number into a FIB sequence number queue. According to some examples, the sequence number processing module 101 may place the FIB sequence number into the FIB sequence number queue 201 in block 410.

According to this example, block 415 involves assigning the FIB sequence number a first state. For example, the sequence number processing module 101 may assign the FIB sequence number a "new" state in block 415.

In this example, block 420 involves receiving a route processing request, including an indication of a route and a platform sequence number associated with a FIB sequence number. According to some examples, the sequence number processing module 101 may receive the route processing request from the hardware platform processing module 103 in block 420.

According to this example, block 425 involves assigning the FIB sequence number a second state. For example, the sequence number processing module 101 may assign the FIB sequence number a "sent to platform" state in block 425.

In this example, block 430 involves placing the route processing request into a route-associated queue corresponding to the route. For example, the sequence number processing module 101 may place the route processing request into one of the per-route request queues 301a-301n in block 430.

According to this example, block 435 involves receiving a route processing response corresponding to a route and corresponding to one or more processing requests, including at least the route processing request. For example, the sequence number processing module 101 may receive a route processing response from the hardware platform processing module 103 in block 435. In some such examples, the route processing response may be a coalesced route processing response that corresponds to more than one processing request.

In this example, block 440 involves removing the route processing request—or, if the route processing response is a coalesced response, removing multiple route processing requests—from the route-associated queue. For example, the sequence number processing module 101 may remove the route processing request from one of the per-route request queues 301a-301n in block 440.

According to this example, block 445 involves assigning the FIB sequence number a third state. For example, the sequence number processing module 101 may assign the FIB sequence number a "processed" state in block 445.

In this example, block 450 involves publishing the FIB sequence number. For example, the sequence number processing module 101 may send the FIB sequence number to one or more other modules implemented by the control system 106 in block 450. In some examples, block 450 may involve publishing all FIB sequence numbers in the FIB sequence number queue having the third state. According to some alternative examples, block 450 may involve publishing the FIB sequence number at the head of the FIB sequence number queue if that FIB sequence number has the third state. According to some examples, method 400—for example, block 450—may involve removing a published FIB sequence number from the FIB sequence number queue. In some examples, method 400 may involve clearing the state of a published FIB sequence number.

According to some examples, method 400 may involve receiving an indication that a route has changed from a first FIB sequence number to a second FIB sequence number. The first FIB sequence number may have the first state. In some examples, method 400 may involve assigning the second FIB sequence number the first state and changing a state of the first FIB sequence number from the first state to an obsoleted state.

In some examples, method 400 may involve ceasing processing of the FIB sequence number queue responsive to determining that a FIB sequence number at a first position of the FIB sequence number queue is not in the obsoleted state or the third state. In this context, "ceasing processing" may involve ceasing to publish FIB sequence numbers, but other functions associated with the FIB sequence number queue may continue if there are still FIB sequence numbers in the FIB sequence number queue. However, responsive to determining that the FIB sequence number queue is empty, method 400 may involve ceasing—or pausing—all processing of the FIB sequence number queue.

FIG. 5 is a block diagram that shows example components of an apparatus according to some disclosed implementations. In this example, the apparatus 501 includes an interface system 504, a control system 506 and a memory system 508. As with other disclosed examples, alternative implementations of the apparatus 501 may include different numbers of elements, different types of elements, or combinations thereof.

Figure 6:
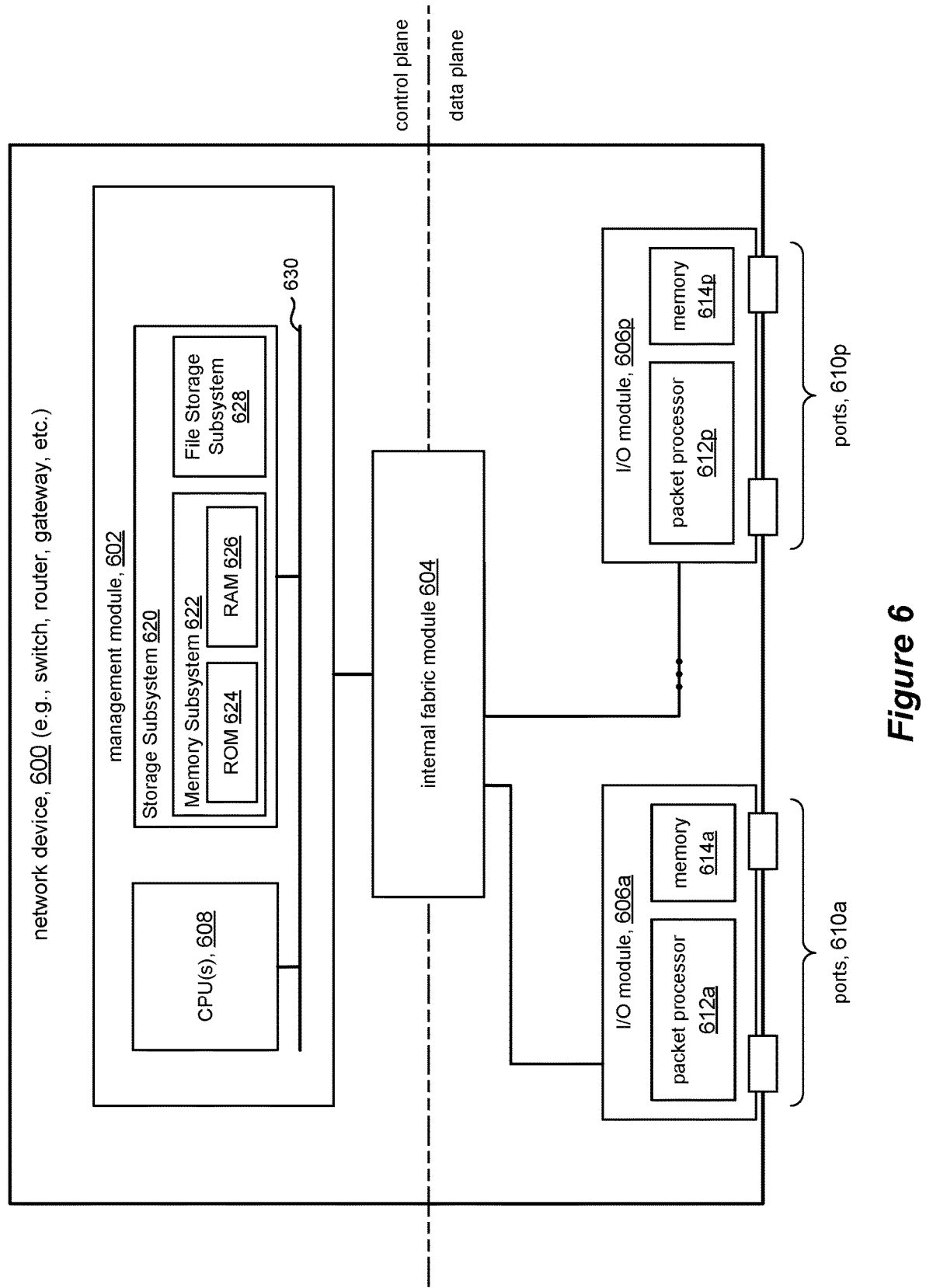
FIG. 6 is a schematic representation of a network device (e.g., switch, router, etc.) that can be adapted in accordance with the present disclosure.

In some implementations, the apparatus 501 may be a network device, such as a router or a switch. According to some implementations, the apparatus 501 may be configured to exchange routing information with one or more neighboring network devices. In some such implementations, the interface system 504 may include a plurality of network interfaces configured for communication between the control system 506 and the control systems of other network devices. The interface system 504 may include internal communication pathways between components of the apparatus 501, including internal communication pathways between modules implemented by the control system 506. Internal fabric module 604, I/O modules 606a-606p and bus subsystem 630, which are described below with reference to FIG. 6, provide examples of such internal communication pathways. Accordingly, the interface system 504 may include one or more interfaces between the control system 506 and the memory system 508, for example via electrically conducting material (e.g., via conductive metal wires or traces).

The control system 506 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. Although the control system 506 and the memory system 508 are shown as separate blocks in FIG. 5, according to some examples the control system 506 also may include one or more memory devices, such as one or more random access memory (RAM) devices, one or more read-only memory (ROM) devices, etc. Accordingly, both the control system 506 and also the memory system 508 may include such components.

According to some examples, a sequence number processing module 101 implemented by the control system 506 is configured to receive, via the interface system 504, information regarding a forwarding information base (FIB) sequence number from an FIB processing module 102 that is also implemented by the control system 506. In some examples, the sequence number processing module 101 is configured to place the FIB sequence number into a FIB sequence number queue implemented in the memory system 508. According to some examples, the sequence number processing module 101 is configured to assign the FIB sequence number a first state, which may be a "new" state.

In some examples, the sequence number processing module 101 is configured to receive, via the interface system 504, a route processing request including an indication of a route and a platform sequence number associated with the FIB sequence number. According to some examples, the sequence number processing module 101 is configured to assign the FIB sequence number a second state, which may be a "sent-to-platform" state. In some examples, the sequence number processing module 101 is configured to place the route processing request into a route-associated queue, implemented in the memory system 508, corresponding to the route.

According to some examples, the sequence number processing module 101 is configured to receive a route processing response corresponding to the route and corresponding to one or more processing requests, including at least the route processing request. In some examples, the sequence number processing module 101 is configured to remove the route processing request from the route-associated queue. According to some examples, the sequence number processing module 101 is configured to assign the FIB sequence number a third state, which may be a "processed" state. According to some examples, the sequence number processing module 101 is configured to publish the FIB sequence number. In some examples, the sequence number processing module 101 is configured to clear the state of the FIB sequence number.

In some examples, the sequence number processing module 101 may receive an indication that a route has changed from a first FIB sequence number having the "new" state to a second FIB sequence number. According to some such examples, the sequence number processing module 101 is configured to assign the second FIB sequence number the new state and to change the state of the first FIB sequence number from the new state to an "obsoleted" state.

According to some examples, the sequence number processing module 101 is configured to cease processing of the FIB sequence number queue—in other words, to pause publishing FIB sequence numbers—responsive to determining that a FIB sequence number at a first position of the FIB sequence number queue is not in the obsoleted state or the processed state. However, in some examples, the sequence number processing module 101 may be configured to publish all FIB sequence numbers in the FIB sequence number queue having the processed state or the obsoleted state. In some examples, a module implemented by the control system 506, such as the route advertising module 105, is configured to exchange routing information with one or more neighboring network devices.

In some examples, the memory system 508 may include one or more memory devices, such as one or more RAM devices, ROM devices, etc. In some implementations, the memory system 508 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 508 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

FIG. 6 is a schematic representation of a network device (e.g., switch, router, etc.) that can be adapted in accordance with the present disclosure. FIG. 6 is an example of the apparatus 501 of FIG. 5. In some embodiments, network device 600 can include a management module 602, an internal fabric module 604, and a number of I/O modules 606a-606p. Management module 602 can constitute the control plane (also referred to as control layer or simply the CPU) of network device 600 and can include one or more management CPUs 608 for managing and controlling operation of network device 600 in accordance with the present disclosure. Each management CPU 608 can be a general-purpose processor, such as an Intel®/AMD® x86, ARM® microprocessor and the like, that operates under the control of software stored in a memory, such as ROM (read-only memory) 624 or RAM (random-access memory) 626. The control plane provides services that include traffic management functions such as routing, security, load balancing, analysis, and the like. In some examples, one or more management CPUs 608 may be configured to perform some or all of the methods disclosed herein, for example according to software stored in the ROM 624 and/or the RAM 626.

Management module 602 includes one or more management CPUs 608 that communicate with storage subsystem 620 via bus subsystem 630. Other subsystems, such as a network interface subsystem (not shown in FIG. 6), may be on bus subsystem 630. Storage subsystem 620 can include memory subsystem 622 and non-volatile storage subsystem 628. Storage subsystem 620 represents an example of non-transitory computer-readable storage media that can store program code and/or data, which when executed by one or more management CPUs 608, can cause one or more management CPUs 608 to perform operations in accordance with embodiments of the present disclosure.

Memory subsystem 622 can include a number of memories including main RAM 626 for storage of instructions and data during program execution and ROM (read-only memory) 624 in which fixed instructions and data are stored. Storage subsystem 628 can provide persistent (i.e., non-volatile) storage for program and data files, and can include various types of storage media known in the art such as solid-state drives, hard-disk drives, and so on.

One or more management CPUs 608 can run a network operating system stored in storage subsystem 620. A network operating system is a specialized operating system for network device 600 (e.g., a router, switch, firewall, and the like). For example, the network operating system may be Arista Extensible Operating System (EOS®), which is a fully programmable and highly modular, Linux-based network operating system. Other network operating systems may be used.

Bus subsystem 630 can provide a mechanism for letting the various components and subsystems of management module 602 communicate with each other as intended. Although bus subsystem 630 is shown schematically as a single bus, alternative embodiments of the bus subsystem can utilize multiple buses.

Internal fabric module 604 and I/O modules 606a-606p collectively represent the data plane of network device 600 (also referred to as data layer, forwarding plane, etc.). Internal fabric module 604 represents interconnections among the various other modules of network device 600. Each I/O module 606a-606p can include one or more input/output (ingress/egress) ports 610a-610p that are used by network device 600 to receive and forward network traffic. Each I/O module 606a-606p can also include packet processing capability, logically represented by respective packet processors 612a-612p and memory components 614a-614p. Packet processors 612a-612p can comprise forwarding hardware, including for example, data processing elements such as an ASIC (application specific integrated circuit), FPGA (field programmable array), digital processing unit, and the like. Memory components 614a-614p can include lookup hardware, including for example, content addressable memory such as TCAMs (ternary CAMs) and auxiliary memory such as SRAMs (static random access memory). The forwarding hardware in conjunction with the lookup hardware can provide wire speed decisions on how to process ingress packets and outgoing packets for egress. In accordance with some embodiments, some aspects of the present disclosure may be performed within the data plane.

Various modifications to the implementations described in this disclosure may be readily apparent to those having ordinary skill in the art. The disclosed examples may be applied to other implementations without departing from the scope of this disclosure. Accordingly, this disclosure is not intended to be limited to the implementations shown and described herein, but is to be accorded the widest scope consistent with the claims, the principles and the novel features disclosed herein. One of ordinary skill in the art will appreciate that the above description and the accompanying drawings have been presented only by way of example and that modifications in detail may be made within the scope of this disclosure.

What is claimed is:

1. A method, comprising:
    receiving information regarding a forwarding information base (FIB) sequence number;
    placing the FIB sequence number into a FIB sequence number queue;
    assigning the FIB sequence number a new state;
    receiving a route processing request including an indication of a route and a platform sequence number associated with the FIB sequence number;
    assigning the FIB sequence number a sent-to-platform state;
    placing the route processing request into a route-associated queue corresponding to the route;
    receiving a route processing response corresponding to the route and corresponding to one or more processing requests, including at least the route processing request;
    removing the route processing request from the route-associated queue;
    assigning the FIB sequence number a processed state; and
    publishing the FIB sequence number.

2. The method of claim 1, further comprising publishing all FIB sequence numbers at a head of the FIB sequence number queue having the processed state.

3. The method of claim 1, further comprising removing the FIB sequence number from the FIB sequence number queue, clearing a state of the FIB sequence number, or both removing the FIB sequence number from the FIB sequence number queue and clearing the state of the FIB sequence number.

4. The method of claim 1, further comprising:
    receiving an indication that a route has changed from a first FIB sequence number to a second FIB sequence number, the first FIB sequence number having the new state;
    assigning the second FIB sequence number the new state; and
    changing a state of the first FIB sequence number from the new state to an obsoleted state.

5. The method of claim 4, further comprising ceasing processing of the FIB sequence number queue responsive to determining that a FIB sequence number at a head of the FIB sequence number queue is not in the obsoleted state or the processed state.

6. The method of claim 1, wherein the route processing request indicates that the route is requested to be processed by a hardware platform.

7. The method of claim 1, further comprising ceasing processing of the FIB sequence number queue responsive to determining that the FIB sequence number queue is empty.

8. The method of claim 1, wherein the method is performed by a sequence number processing module implemented by a network device control system.

9. The method of claim 8, wherein publishing the FIB sequence number involves sending the FIB sequence number to one or more other modules implemented by the network device control system.

10. The method of claim 8, wherein the network device control system is a component of a network device configured for exchanging routing information with one or more neighboring network devices.

11. A network device, comprising:
    an interface system;
    a memory system; and
    a control system configured to:
        receive, via the interface system, information regarding a forwarding information base (FIB) sequence number;
        place the FIB sequence number into a FIB sequence number queue implemented in the memory system;
        assign the FIB sequence number a new state;
        receive a route processing request including an indication of a route and a platform sequence number associated with the FIB sequence number;
        assign the FIB sequence number a sent-to-platform state;
        place the route processing request into a route-associated queue corresponding to the route, the route-associated queue being implemented in the memory system;
        receive a route processing response corresponding to the route and corresponding to one or more processing requests, including at least the route processing request;
        remove the route processing request from the route-associated queue;
        assign the FIB sequence number a processed state; and
        publish the FIB sequence number.

12. The network device of claim 11, wherein the control system is further configured to publish all FIB sequence numbers in the FIB sequence number queue having the processed state.

13. The network device of claim 11, wherein the control system is further configured to remove the FIB sequence number from the FIB sequence number queue, to clear a state of the FIB sequence number, or to both remove the FIB sequence number from the FIB sequence number queue and clear the state of the FIB sequence number.

14. The network device of claim 11, wherein the control system is further configured to:

receive an indication that a route has changed from a first FIB sequence number to a second FIB sequence number, the first FIB sequence number having the new state;

assign the second FIB sequence number the new state; and change a state of the first FIB sequence number from the new state to an obsoleted state.

15. The network device of claim 14, wherein the control system is further configured to cease processing of the FIB sequence number queue responsive to determining that a FIB sequence number at a head of the FIB sequence number queue is not in the obsoleted state or the processed state.

16. The network device of claim 11, wherein the control system is further configured to exchange routing information with one or more neighboring network devices.

17. One or more non-transitory media having instructions for controlling a network device to perform a method stored thereon, the method comprising:

receiving information regarding a forwarding information base (FIB) sequence number;

placing the FIB sequence number into a FIB sequence number queue;

assigning the FIB sequence number a new state;

receiving a route processing request including an indication of a route and a platform sequence number associated with the FIB sequence number;

assigning the FIB sequence number a sent-to-platform state;

placing the route processing request into a route-associated queue corresponding to the route;

receiving a route processing response corresponding to the route and corresponding to one or more processing requests, including at least the route processing request;

removing the route processing request from the route-associated queue;

assigning the FIB sequence number a processed state; and publishing the FIB sequence number.

18. The one or more non-transitory media of claim 17, wherein the method further comprises publishing all FIB sequence numbers in the FIB sequence number queue having the processed state.

\* \* \* \* \*